United States Patent
Naborskyy et al.

(10) Patent No.: US 7,415,547 B1
(45) Date of Patent: Aug. 19, 2008

(54) TRACKING STATES OF COMMUNICATION BETWEEN PS/2 HARDWARE AND HARDWARE DRIVERS WITHIN AN EXTENSIBLE FIRMWARE INTERFACE ENVIRONMENT

(75) Inventors: Andriy Naborskyy, Lilburn, GA (US); Oleg Ilyasov, Lilburn, GA (US)

(73) Assignee: American Megatrends, Inc., Norcross, GA (US)

(*) Notice: Subject to any disclaimer, the term of this patent is extended or adjusted under 35 U.S.C. 154(b) by 321 days.

(21) Appl. No.: 11/118,257

(22) Filed: Apr. 29, 2005

(51) Int. Cl.
*G06F 3/00* (2006.01)
(52) U.S. Cl. ............ 710/15; 710/2; 710/5; 710/73
(58) Field of Classification Search ............ 710/5, 710/15, 73, 2
See application file for complete search history.

(56) References Cited

U.S. PATENT DOCUMENTS

| | | | |
|---|---|---|---|
| 4,527,250 A * | 7/1985 | Galdun et al. ............ | 715/700 |
| 5,964,853 A * | 10/1999 | Falik et al. ............ | 710/73 |
| 6,106,564 A | 8/2000 | Chen | |
| 6,229,538 B1 | 5/2001 | McIntyre et al. | |
| 6,532,499 B1 | 3/2003 | Nakamura | |
| 6,678,766 B1 | 1/2004 | Feustel | |
| 6,802,015 B2 | 10/2004 | Atkinson | |
| 6,826,699 B1 * | 11/2004 | Sun ............... | 726/5 |
| 6,988,139 B1 * | 1/2006 | Jervis et al. ............ | 709/226 |
| 7,028,299 B1 * | 4/2006 | Chang ............ | 718/104 |
| 7,047,331 B2 | 5/2006 | Dickens | |
| 7,191,263 B2 * | 3/2007 | Sankaravadivelu et al. .... | 710/62 |
| 7,206,974 B2 | 4/2007 | Kozlov | |
| 2002/0162038 A1 | 10/2002 | Bullman | |
| 2005/0229000 A1 | 10/2005 | Shoji et al. | |
| 2005/0246719 A1 * | 11/2005 | Oshins et al. ............ | 719/318 |
| 2006/0168376 A1 * | 7/2006 | Ilyasov ............ | 710/67 |

OTHER PUBLICATIONS

Thomas, Dave and Hunt, Andy. "State Machines". IEEE Software. vol. 19, Issue 6. Nov./Dec. 2002. pp. 10-12.*
Extensible Firmware Interface Specification, Intel Corp., Dec. 1, 2002, Ver. 1.10.*
Coraor, Lee et al., A General Model for Memory-Based Finite-State Machines, Feb. 1987, IEEE Transactions on Computers, vol. C-36, pp. 175-184.*

(Continued)

*Primary Examiner*—Niketa I. Patel
*Assistant Examiner*—Zachary K Huson
(74) *Attorney, Agent, or Firm*—Hope Baldauff Hartman, LLC (57) ABSTRACT

Methods, systems, and computer-readable media track a state of communication between a PS/2 device and a PS/2 device driver within an EFI environment. The method involves receiving from an application, a request for data and in response to receiving the request, reading a state machine table within the PS/2 device driver to determine a last known state of communication associated with the PS/2 device. The last known state of communication is stored within the state machine table. The method also involves, based on the last known state stored, utilizing the state machine table to select and execute a routine to send a command, receive a reply from the PS/2 device to a command, change the state of communication when a condition is met, store changes in the last known state of communication, and/or pass control back to the application thereby reducing delay associated with waiting on slow PS/2 device replies.

16 Claims, 8 Drawing Sheets

OTHER PUBLICATIONS

U.S. Official Action dated Aug. 9, 2007 in U.S. Appl. No. 11/119,318.
U.S. Official Action dated Dec. 17, 2007, in U.S. Appl. No. 11/119,318.
U.S. Notice of Allowance / Allowability dated Jun. 13, 2008 in U.S. Appl. No. 11/119,318.

* cited by examiner

| 802 PROCESS STATES | 602 ENTER PROCEDURE | 604 GUARD CONDITION DATA | 607 NEXT STATE | 805 STATUS |
|---|---|---|---|---|
| 1 | ADDRESS | 1 | 2 | |
| 2 | SEND GET STATUS COMMAND | WAIT ACKNOWLEDGE 3 BYTES | 3 | IN PROGRESS |
| 3 | | WAIT (0) | 4 | BYTE 0 = ACK DATA READY |
| 4 | | WAIT (0) | 5 | BYTE 0 RECEIVED |
| 5 | | WAIT (1) | 6 | BYTE 1 RECEIVED |
| 6 | | WAIT (2) | 7 | BYTE 2 RECEIVED |
| 7 | PROCESS BYTES | | 1 | |

*FIG. 8*

TRACKING STATES OF COMMUNICATION BETWEEN PS/2 HARDWARE AND HARDWARE DRIVERS WITHIN AN EXTENSIBLE FIRMWARE INTERFACE ENVIRONMENT

CROSS-REFERENCE TO RELATED APPLICATIONS

This patent application is related to and filed with U.S. patent application Ser. No. 11/119,318, entitled "Methods, Systems, and Computer-readable Mediums for Servicing PS/2 Devices within an Extensible Firmware Interface (EFI) environment," filed on Apr. 29, 2005 that is assigned to the same assignee as this application. The aforementioned patent application is expressly incorporated herein, in its entirety, by reference.

TECHNICAL FIELD

The present invention generally relates to tracking states of communication between PS/2 hardware and a corresponding driver within an Extensible Firmware Interface (EFI) environment. More particularly, the present invention relates to implementing a state machine within a PS/2 device driver servicing hardware within an EFI environment.

BACKGROUND

In most computing systems, low level instruction code is used as an intermediary between the hardware components of the computing system and the operating software and other high-level software executing on the computing system. In some computer systems, this low level instruction code is known as the Basic Input and Output System ("BIOS"). The BIOS provides a set of software routines that allow high level software to interact with the hardware components of the computing system using standard calls.

Because of limitations of the BIOS in many PC-compatible computers, a new specification for creating the firmware that is responsible for booting the computer and for intermediating the communication between the operating system and the hardware has been proposed. The new specification is called the Extensible Firmware Interface ("EFI") specification and is available from INTEL CORPORATION.

The EFI specification describes an interface between the operating system and the system firmware. In particular, the EFI specification defines the interface that platform firmware must implement and the interface that the operating system may use in booting. How the firmware implements the interface is left up to the manufacturer of the firmware. The EFI specification provides protocols for EFI drivers to communicate with each other, and the EFI core provides functions such as allocation of memory, creating events, setting the clock, and many others. This is accomplished through a formal and complete abstract specification of the software-visible interface presented to the operating system by the platform and the firmware.

The EFI is capable of providing services to other applications. Services are implemented by modules that may be loaded by a boot loader when the EFI is started. The services may provide memory management, domain services, driver services, protocol services, and others. PS/2 drivers, such as an EFI mouse driver, must follow a protocol of data exchange during initialization of or while in communication with a PS/2 device, such as a mouse, floppy disk drive, or joy stick. This protocol of data exchange involves sequences of bytes or packets of data read from or exchanged with the PS/2 device. The PS/2 device is slow in comparison to the central processing unit (CPU) of a computing apparatus. The PS/2 device may even be one thousand times slower than the CPU. Thus, after a byte of data is read from the PS/2 device, there is a waiting period before the next byte of data appears at a device controller.

However, waiting on the next byte of data is not always acceptable when a computing system or apparatus has other tasks to perform. For instance, when an application calls a driver to quickly check if there is a change in the mouse position, the application may not be interested in retrieving the data immediately. Thus, when procedures, such as a timer event, cause the application to wait for the data other events are also on hold, which is inefficient. Moreover, some timer events time out in the middle of a sequence and are terminated after a fixed amount of elapsed time. Accordingly, there is a need for a method, system, and apparatus for tracking a state of communication between a PS/2 device and a PS/2 device driver within an EFI environment.

It is with respect to these considerations and others that the various embodiments of the invention have been made.

SUMMARY

In accordance with the present invention, the above and other problems are solved by methods, systems, and computer-readable mediums for tracking a state of communication between a PS/2 device and a PS/2 device driver within an EFI environment. Through the use of a novel EFI PS/2 device driver that remembers the state of communication between the PS/2 device and the PS/2 device driver, embodiments of the invention track the state of communication of the PS/2 device within an EFI environment by implementing a state machine within the PS/2 device driver. Whenever control passes to the PS/2 device driver, a state machine table is utilized to select and execute a routine to send a next command per a protocol of communication and/or receive a reply to a command. Thus, the PS/2 device driver does not hold control by waiting on a slow PS/2 device reply, but instead control is passed back to the system to proceed and communication with the PS/2 device resumes when an application returns control to the PS/2 device driver. Consequently, data distribution is more efficient, the structure of the EFI PS/2 device driver is more accessible, and problems with delay while waiting on slow device replies are prevented.

According to one embodiment of the invention, a method is provided for tracking a state of communication between a PS/2 device and a PS/2 device driver within an EFI environment. The method involves receiving from an application associated with the EFI environment a request for data and in response to receiving the request, reading a state machine table within the PS/2 device driver to determine a last known state of communication associated with the PS/2 device. The last known state of communication is stored within the state machine table. The method also involves, based on the last known state stored, utilizing the state machine table to select and execute a routine to send a command per a protocol of communication, receive a reply to a command from the PS/2 device, and/or change the state of communication when a condition is met. A routine selected may also be operative to store changes in the last known state of communication and/or pass control back to the application thereby reducing delay associated with waiting on slow PS/2 device replies.

Another embodiment is a computer-readable medium having control logic stored therein for causing a computer to track a state of communication between a PS/2 device and a PS/2 device driver within an EFI environment. The control logic includes computer-readable program code for causing the computer to receive from an application associated with the EFI environment a request for data and in response to receiving the request, read a state machine table within the PS/2 device driver to determine a last known state of communication associated with the PS/2 device. The last known state of communication is stored within the state machine table. The control logic includes computer-readable program code for causing the computer to, based on the last known state stored, utilize the state machine table to select and execute a routine operative to send a command per a protocol of communication, receive a reply to the command from the PS/2 device, and/or change the state of communication when a condition is met. A routine may also be operative to store changes in the last known state of communication and pass control back to the application thereby reducing delay associated with waiting on slow PS/2 device replies.

Still another embodiment is a method for tracking a state of communication between a PS/2 device and a PS/2 device driver within an EFI environment. The method involves determining a current state in processing a data sequence being sent from the PS/2 device. The current state may be a state indicating that data has been processed, a state indicating that a command is in progress, or a state indicating that data is ready. The method further involves in response to determining that the current state is the state indicating that data has been processed, sending a command to determine a status of the PS/2 device and storing the current state as the state indicating that a command is in progress.

Still further, the method involves in response to the current state being the state indicating that a command is in progress, determining whether the PS/2 device has data available for delivery to the PS/2 device driver. And in response to determining that no data is available for delivery, returning a status indicating that data is not ready, storing the current state as the state indicating that a command is in progress, and passing control back to the application thereby reducing delay associated with waiting on slow PS/2 device replies.

Aspects of the invention may be implemented as a computer process, a computing system, or as an article of manufacture such as a computer program product or computer-readable medium. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages, which characterize the present invention, will be apparent from a reading of the following detailed description and a review of the associated drawings.

DETAILED DESCRIPTION

Embodiments of the present invention provide methods, systems, apparatuses, and computer-readable media for tracking a state of communication between a PS/2 device and a PS/2 device driver within an EFI environment. In the following detailed description, references are made to the accompanying drawings that form a part hereof, and in which are shown by way of illustration specific embodiments or examples. Referring now to the drawings, in which like numerals represent like elements throughout the several figures, aspects of the present invention and the exemplary operating environment will be described.

Figure 1:
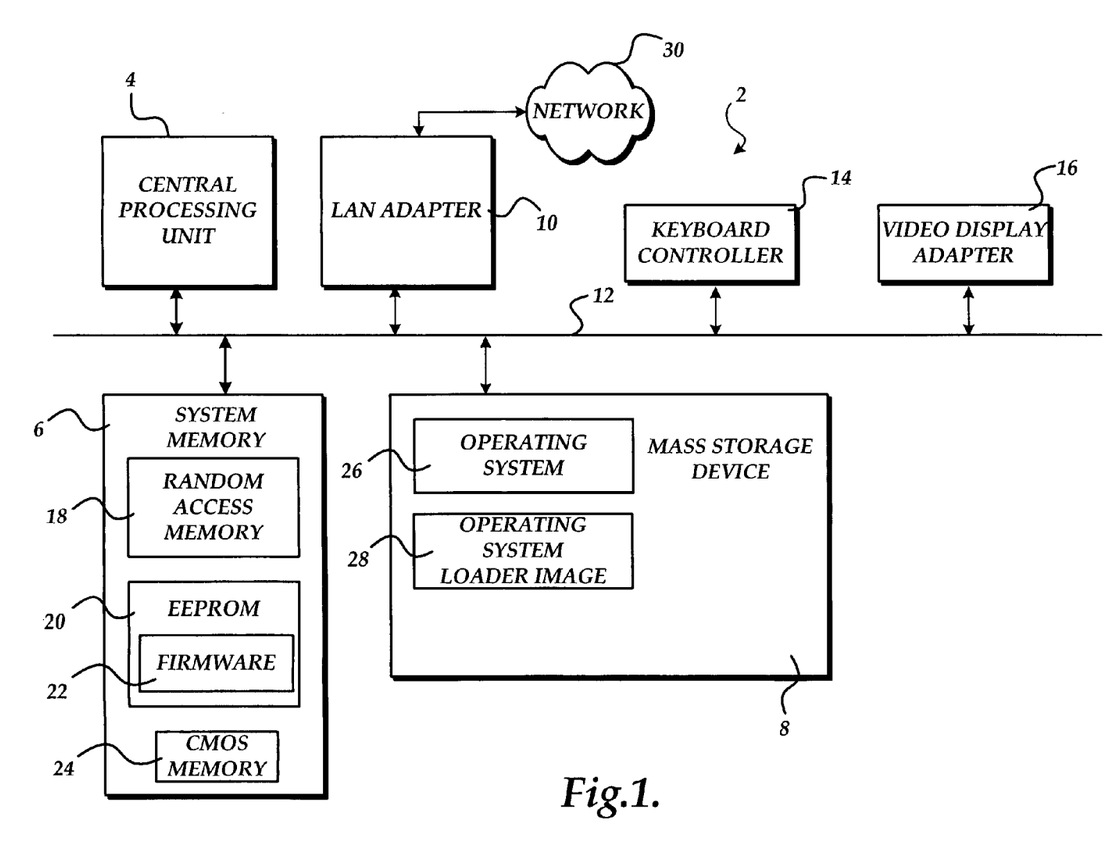
FIG. 1 is a computer architecture diagram that illustrates various components of a computer utilized in embodiments of the invention.

FIG. 1 and the following discussion are intended to provide a brief, general description of a suitable computing environment in which the invention may be implemented. While the invention will be described in the general context of program modules that execute in conjunction with the execution of a computer firmware, those skilled in the art will recognize that the invention may also be implemented in combination with other program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Turning now to FIG. 1, an illustrative computer architecture for a computer 2 utilized in the various embodiments of the invention will be described. The computer architecture shown in FIG. 1 illustrates a conventional computer, including a CPU 4, a system memory 6, including a RAM 18, an EEPROM 20, a CMOS memory 24, and a system bus 12 that couples the memory to the CPU 4. According to an embodiment of the invention, the CPU 4 may comprise a general purpose microprocessor from INTEL CORPORATION. For instance, the CPU 4 may comprise a PENTIUM 4 or XEON microprocessor from INTEL CORPORATION. It should be appreciated that any type of CPU may be utilized including INTEL-compatible devices from AMD, MIPS processors, POWERPC devices from IBM, or other types of RISC or CISC processors.

The EEPROM 20 may store a firmware 22 for use in operating the computer 2, such as a BIOS or an extensible firmware interface ("EFI"), containing the basic routines that perform basic platform initialization and prepare the computer 2 to launch an operating system. The CMOS memory 24 is a battery-backed memory device that may be used by the firmware 22 to store setting information for the computer 2. In the case of an EFI firmware, the EEPROM 20 may be utilized to store configuration information. Additional details regarding the architecture and operation of the firmware 22 will be provided below with respect to FIGS. 2 and 3.

The computer 2 further includes a mass storage device 8 for storing an operating system 26, an operating system loader image 28, application programs, and other program modules. The mass storage device 8 is connected to the CPU 4 through a mass storage controller (not shown) connected to the bus 12. The mass storage device 8 and its associated computer-readable media, provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 2.

According to various embodiments of the invention, the computer 2 may operate in a networked environment using logical connections to remote computers through a network 30, such as the Internet. The computer 2 may connect to the network 30 through a local area network ("LAN") adapter 10 connected to the bus 12. It should be appreciated that the LAN adapter 10 may also be utilized to connect to other types of networks and remote computer systems. The computer 2 may also include a keyboard controller 14 for receiving input from a keyboard and a video display adapter 16 for providing output to a display screen.

Figure 2:
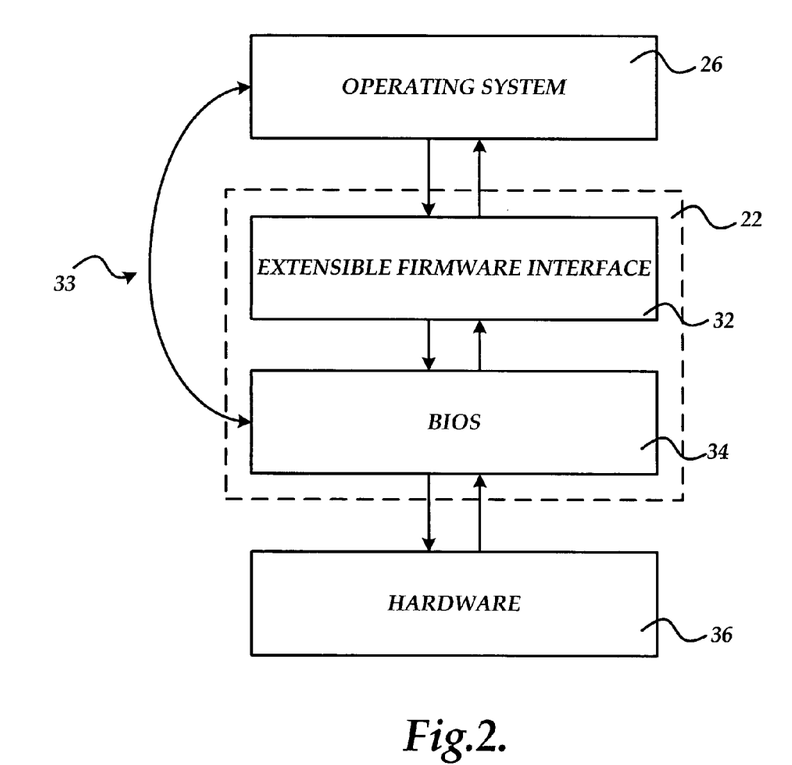
FIGS. 2 and 3 are computer architecture diagrams that illustrate aspects of an EFI environment utilized by embodiments of the invention.

Referring now to FIG. 2, additional details regarding the operation of the firmware 22 of the computer 2 will be described. According to embodiments of the invention, the firmware 22 may comprise a computer basic input output system ("BIOS"). As known to those skilled in the art, the BIOS of a PC-compatible computer provides an interface between the operating system 26 and the hardware 36 of the computer 2. Alternatively, the firmware 22 may comprise a firmware compatible with the EFI specification ver. 1.1 from INTEL CORPORATION.

The EFI specification describes an interface between the operating system 26 and the system firmware 22. The EFI specification defines the interface that platform firmware must implement, and the interface that the operating system 26 may use in booting. How the firmware 22 implements the interface is left up to the manufacturer of the firmware. The intent of the specification is to define a way for the operating system 26 and firmware 22 to communicate only information necessary to support the operating system boot process. This is accomplished through a formal and complete abstract specification of the software-visible interface presented to the operating system by the platform and the firmware.

According to one implementation of EFI on INTEL CORPORATION IA-32 platforms, both the EFI 32 and a BIOS 34 may be presented in the firmware 22. This allows users and system integrators to support both firmware interfaces. In order to provide this functionality, an interface 33 may be provided for use by legacy operating systems and applications. Additional details regarding the architecture and operation of the EFI 32 are provided below with respect to FIG. 3. Moreover, additional details regarding the operation and architecture of EFI can be found in the EFI specification which is available from INTEL CORPORATION and is expressly incorporated herein by reference.

Figure 3:
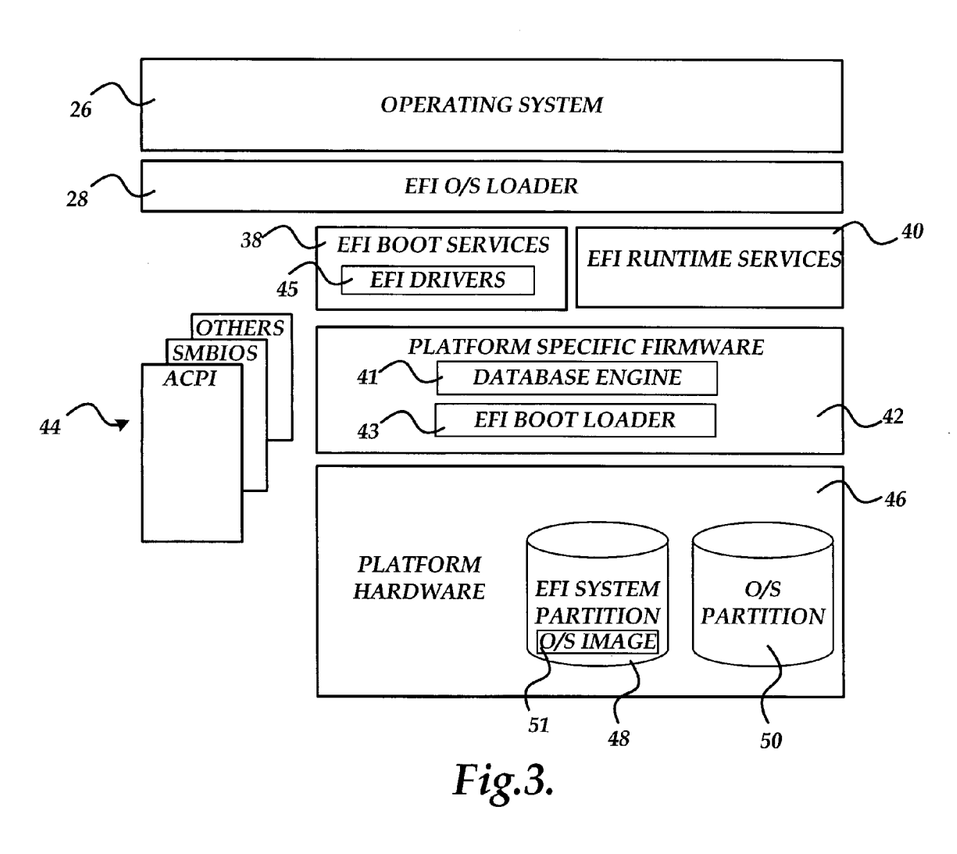

Turning now to FIG. 3, additional details regarding an EFI specification-compliant system utilized to provide an operating environment for the various embodiments of the invention will be described. As shown in FIG. 3, the system includes platform hardware 46 and an operating system 26. The platform firmware 42 may retrieve an OS image 51 from the EFI system partition 48 using an EFI O/S loader 28. The EFI system partition 48 may be an architecturally shareable system partition. As such, the EFI system partition 48 defines a partition and file system that are designed to allow safe sharing of mass storage between multiple vendors. An O/S partition 50 may also be utilized.

Once started, the EFI O/S loader 28 continues to boot the complete operating system 26. In doing so, the EFI O/S loader 28 may use EFI boot services 38 and interface to other supported specifications to survey, comprehend, and initialize the various platform components and the operating system software that manages them. Thus, interfaces 44 from other specifications may also be present on the system. For example, the Advanced Configuration and Power Management Interface ("ACPI") and the System Management BIOS ("SMBIOS") specifications may be supported.

EFI boot services 38 provides interfaces for devices and system functionality that can be used during boot time. EFI runtime services 40 may also be available to the O/S loader 28 during the boot phase. For example, a minimal set of runtime services may be presented to ensure appropriate abstraction of base platform hardware resources that may be needed by the operating system 26 during its normal operation. EFI allows extension of platform firmware by loading EFI driver and EFI application images which, when loaded, have access to all EFI-defined runtime and boot services.

Various program modules provide the boot and runtime services. These program modules may be loaded by the EFI boot loader 43 at system boot time. The EFI boot loader 43 is a component in the EFI firmware that determines which program modules should be explicitly loaded and when. Once the EFI firmware is initialized, it passes control to the boot loader 43. The boot loader 43 is then responsible for determining which of the program modules to load and in what order.

The various program modules executing within the EFI may have a need to store data in an easy to access and manage manner. Because the various program modules may utilize data of virtually any data type, there is also a need to store data of any arbitrary data type. The database engine 41 executes within the EFI and provides these services to other program modules executing within the EFI. The database engine 41 may be provided as a part of the EFI core or as a separate EFI driver. In particular, program modules executing within the EFI can utilize the database engine 41 to index stored data in a database. Records can be added to the database, removed from the database, and the database may be searched. Other types of database functions may also be performed on the records stored by the database engine 41.

A major feature of the EFI environment is modularity. Thus, every piece of hardware, such as a keyboard and a mouse, may be represented by a driver. EFI drivers 45 are a set of independent drivers that are capable of communicating with each other. The EFI drivers 45 are designed to access boot devices in a pre-boot environment. These drivers may manage or control hardware buses or devices on a platform or they may provide some software derived platform specific service. An EFI driver installs itself as a protocol handler for a particular device. Additional details regarding some of the EFI drivers 45 will be described below with respect to FIGS. 4-8.

Figure 4:
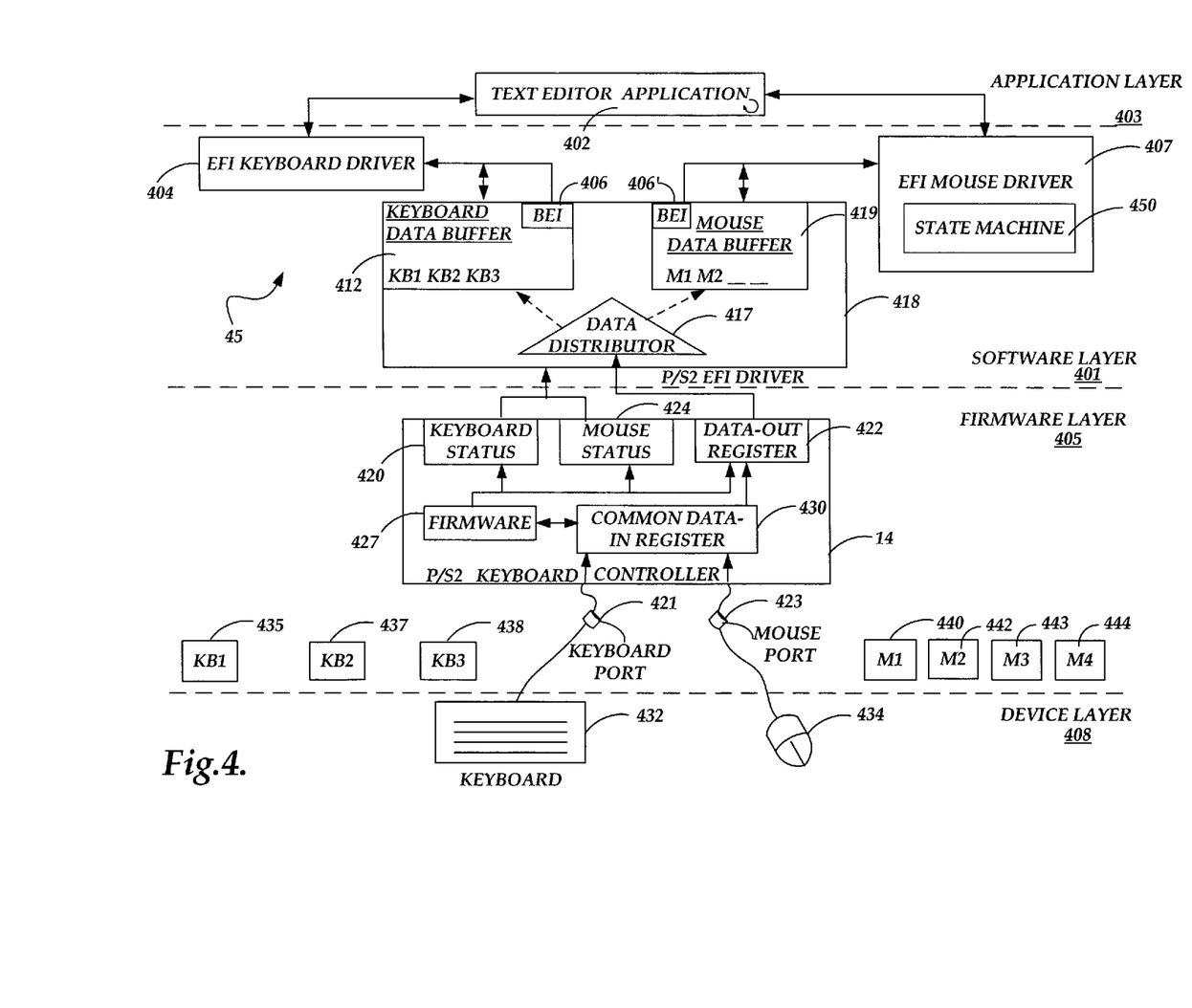
FIG. 4 is a block diagram that illustrates various components of a layered operating environment utilized in tracking a state of communication between a PS/2 device and a PS/2 device driver according to an embodiment of the invention.

FIG. 4 is a block diagram that illustrates various components of a layered operating environment utilized in servicing PS/2 devices, such as a PS/2 keyboard 432 and a PS/2 mouse 434, according to an embodiment of the invention. As illustrated, the EFI drivers 45 within a software layer 401 include an EFI keyboard driver 404, an EFI mouse driver 407, and a PS/2 EFI driver 418. The EFI keyboard driver 404 and the EFI mouse driver 407 are in communication with an application layer 403 including applications, such as a text editor application 402. The PS/2 EFI driver 418 is in communication with the PS/2 keyboard controller 14 on a firmware layer 405 and the EFI keyboard driver 404 and the EFI mouse driver 407 on the software layer 401. The PS/2 keyboard controller 14 receives data from the keyboard 432 and the mouse 434 on a device layer 408. In the alternative the EFI keyboard driver 404 and the EFI mouse driver 407 may be in direct communication with the PS/2 keyboard controller 14. Moreover, additional details regarding the operation and architecture of PS/2 keyboard controllers and other PS/2 devices can be found in the IBM Personal System/2 and Personal Computer BIOS Interface Technical Reference. Second edition. IBM Corporation, IBM No. S68X-2341-00, 1988.

The EFI specification specifies SimpleInput and SimplePointer protocols that are implemented by the EFI keyboard driver 404 and the EFI mouse driver 407 respectfully. Applications, such as the text editor application 402, use these protocols to observe input data from hardware, such as the keyboard 432 and the mouse 434, as the EFI drivers 45 service the hardware. The PS/2 EFI driver 418 communicates directly with firmware, the keyboard controller 14, of the hardware. The keyboard controller 14 services at least two different devices, the keyboard 432 and the mouse 434. It should be appreciated that the mouse 434 may also be a touchpad or other pointer device.

The keyboard controller 14 includes two independent ports 421 and 423 that allow the keyboard and the mouse to connect to the same controller. The keyboard controller 14 includes a common data-in register 430 in communication with the keyboard port 421 and the mouse port 423. Firmware 427 is also within the keyboard controller 14. The firmware 427 allows the keyboard controller 14 to differentiate between data coming from the mouse 434 and data coming from the keyboard 432. The firmware 427 communicates with the data-in register 430 and analyzes the data coming from the two ports 421 and 423 to determine an origin of the data.

The keyboard controller 14 also includes a common output or data-out register 422, which is, in this illustrative embodiment, the only output register for both devices. The data-out register 422 is accessible by the EFI drivers 45. The PS/2 EFI driver 418 is able to distinguish whether the data has come from the mouse 434 or from the keyboard 432 by checking a keyboard status register 420 and/or a mouse status register 424 within the keyboard controller 14. The PS/2 EFI driver 418, which includes the same required polling mechanism as the other drivers, serves as a single point for accessing the data-out register 422 of the keyboard controller 14. A data distributor mechanism 417 is included in the PS/2 EFI driver 418 to dispatch the data from the keyboard 432 to a memory destination 412 within the PS/2 EFI driver 418 for keyboard data. Similarly, when data is coming from the mouse 434, this data will be dispatched or sorted to a memory destination 419 for the mouse data. Thus, there are at least two internal destinations for data prepared by the PS/2 EFI driver 418 from which the EFI keyboard driver 404 and the EFI mouse driver 407 receive data.

According to this illustrative embodiment, it should be appreciated that although polling of the keyboard controller 14 still occurs within the PS/2 EFI driver 418, the status concerning data availability is not directly provided to the keyboard driver and mouse driver by the keyboard controller 14. The status concerning data availability is provided to these drivers by the PS/2 EFI driver 418. Because the PS/2 EFI driver 418 dispatches data from both devices, data is instantly available to the EFI mouse and keyboard drivers 407 and 404 whenever the data arrives at the keyboard controller 14 from the mouse 434 or the keyboard 432.

For instance, a multi-byte sequence of data produced by someone pressing a keyboard key, for example a functional key such as F1, and clicking a mouse button is instantly made available to the EFI keyboard driver 404 and the EFI mouse driver 407 by the PS/2 EFI driver 418 when the data is forwarded to the keyboard controller 14. Pressing a functional key can produce three scan codes KB1 435, KB2 437, and KB3 438. Similarly, clicking a mouse button produces two scan codes M1 440 and M2 442 or initializing the mouse 434 may produce four bytes of data M1 440, M2 442, M3 443, and M4 444. In previous systems, when there is a delay between the four bytes of data being made available to the EFI mouse driver 407, the EFI mouse driver would wait until the bytes of data arrived or at least until a timer timed out. This creates inefficiency.

However, in the present invention, the EFI mouse driver 407 includes a state machine 450 for tracking a state of communication between mouse 434 and the EFI mouse driver 407. The state machine 450 may be described in C source language that will translate to a table with references to C routines. The C routines are operative to send a command per a protocol of communication, receive a reply from the PS/2 device to a command, and/or change the state of communication when a condition is met. The C routines are also operative to store changes in the last known state of communication and pass control back to the application 402. Additional details regarding tracking the state of communication associated with the mouse 434 will be described below with respect to FIGS. 5-8.

As briefly described above, when the mouse 434 is clicked or moved at the same time, the sequence of scan codes in the data-out register can stagger between keyboard data and mouse data. The PS/2 EFI driver 418 sorts the data to avoid irretrievability, because the F1 key will only be retrievable if all three bytes of data KB1+KB2+KB3 are read and the mouse-click on the mouse 434 can be retrieved only when both bytes M1+M2 of data from the mouse are read. The PS/2 EFI driver 418 treats all the data from the output register 422 one-by-one. When the PS/2 EFI driver 418 recognizes keyboard data, it will distribute the keyboard data to the keyboard data destination 412. Similarly, when the PS/2 EFI driver 418 recognizes mouse data, it distributes the mouse data to the mouse data destination 419. As illustrated, the data arrives at the destinations 412 and 419, for example data buffers, in the order it was sent KB1, KB2, KB3 at the keyboard data destination 412 and M1 and M2 at the mouse data destination 419. When, for example, M3 and M4 are delayed, the EFI mouse driver 407 will pass control back to the text editor application 402 for other tasks to be completed.

As illustrated, the data arrives at the data buffers 412 and 419 in the order it was sent, KB1, KB2, KB3 at the keyboard data buffer 412 and M1 and M2 at the mouse data buffer 419. Thus, the data becomes available in the data buffers 412 and 419 for consumption. In this illustrative embodiment, the consumer of the data is the EFI keyboard driver 404 and the EFI mouse driver 407. These drivers will know about the availability of the data just by reading a corresponding keyboard or mouse data buffer empty indicator (BEI) 406 or 406' at a memory destination. Thus, when data has been dispatched from the keyboard controller 14, the keyboard controller 14 is available for other keystrokes or the mouse movements while the PS/2 EFI driver 418 processes the data in the order it was sent.

Use of the PS/2 EFI driver 418 may begin when the text editor application 402 starts requesting the keys or requesting the mouse coordinates for display. The text editor application 402 produces a screen display and it needs user input. The text editor application 402 sends a loop asking the EFI keyboard driver 404 and/or the EFI mouse driver 407 for input and pointer data respectfully. Next, in response to the request from the text editor application 402, the EFI keyboard driver 404 and/or the EFI mouse driver 407 requests data from the PS/2 EFI driver 418. For instance, the EFI drivers 404 and 407 can verify whether data is present in the keyboard data buffer 412 or the mouse data buffer 407 by respectively checking the BEI 406 or 406'. When the BEI 406 or 406' indicates that the buffer is not empty, the EFI drivers 404 and/or 407 read the memory destination that contains an indication of the presence of keyboard and/or mouse data.

The PS/2 EFI driver 418 then determines whether any data is available in the keyboard controller 14 by detecting a status of the keyboard status register 420 and the mouse status register 424. If either status register indicates a presence of data, the PS/2 EFI driver 418 dispatches the data from the data-out register to the data distributor 417 and then distributes the data between the mouse and keyboard data destinations for delivery to the EFI keyboard and/or mouse drivers. When the data is dispatched the corresponding status register is cleared until more data arrives in the keyboard controller 14. If no data is available the PS/2 EFI driver returns no data. In turn, the EFI mouse driver 407 will return a data not ready status to the application 402 and pass control back to the application. Thus, the PS/2 EFI driver 418 may be initiated in response to a request from the mouse and/or keyboard driver for data. When the text editor application 402 requests data a second time from the keyboard driver 412, the data will be waiting in the queue of the keyboard driver 404 ready to be passed to the text editor application 402, thereby improving efficiency. Additional details regarding tracking a state of communication between the mouse 434 and the EFI mouse driver 407 will be described below with respect to FIG. 5.

Figure 5:
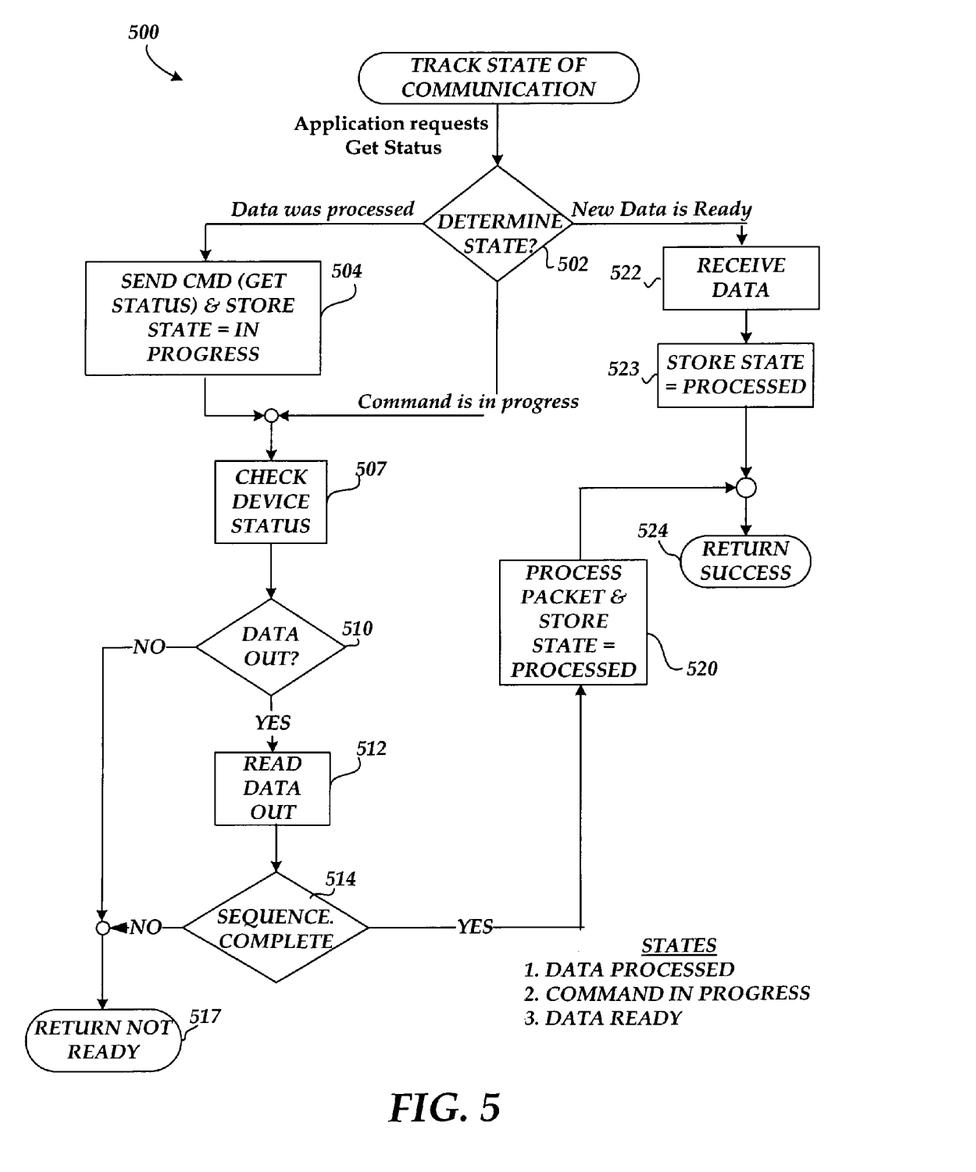
FIG. 5 is a flow diagram illustrating operations performed in tracking a state of communication between a PS/2 device and a PS/2 device driver within an EFI environment according to an embodiment of the invention.

Referring now to FIGS. 4 and 5, an illustrative routine 500 will be described in detail for tracking a state of communication between a PS/2 device and a PS/2 device driver within an EFI environment according to an embodiment of the invention. The logical operations of the various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

The routine 500 begins at operation 502, where the mouse driver 407 determines a current state of communication associated with the mouse 434. According to this embodiment there are three potential states. A state indicating that data has been processed, a state indicating that a command is in progress thus, data is not ready, and a state indicating that data is ready. It should be appreciated that operation 502 may be prompted in response to the EFI mouse driver 407 receiving a request for data from the text editor application 402. For instance, the text editor application 402 may request data from the EFI mouse driver 407 for a screen display. In order to determine the current state of communication, the EFI mouse driver 407 reads the state machine table 450 for a last known state of communication stored in the state machine table. It should be appreciated that an initial state of communication the first time through the routine 500 will be set to indicate that data has been processed.

When the EFI mouse driver 407 determines that the current state is the state indicating that data has been processed, the routine 500 continues from operation 502, to operation 504. At operation 504, the EFI mouse driver 407 sends a "GET STATUS" command to the mouse 434. This command may be one byte in size and sending the command takes minimal time. From operation 504, the routine 500 continues to operation 507.

At operation 507, a status of the mouse 434 is checked. Here the EFI mouse driver 407 makes a determination as to whether there is any data available from the mouse 434. Next, at operation 510, the EFI mouse driver may determine whether any data is present in a data out register of the keyboard controller 14 by requesting data from the PS/2 EFI driver 418.

According to this illustrative embodiment, in response to receiving the request for data, the PS/2 EFI driver 418 determines whether a keyboard status and/or a mouse status is set in the PS/2 keyboard controller 14. The PS/2 EFI driver 418 determines the mouse status by detecting whether the mouse status register 424 indicates that mouse data is available for dispatch in the keyboard controller 14. When mouse movements or mouse buttons are pressed at the mouse 434, data, such as the bytes 440, 442, 443, and 444 as an initialization sequence, is forwarded to the data-in register 430 at a speed much slower than the CPU 4 (FIG. 1). The firmware 427 examines the data and determines the origin of the data. When the data is from the mouse 434, the firmware 427 updates the mouse status register 424 to indicate that mouse data is present in the keyboard controller 14. Similarly, when data is sent from the keyboard 432, the firmware 427 updates the keyboard status register 420 to indicate keyboard data, such as the scan codes 435, 437, and 438, is present in the keyboard controller 14.

In response to determining that the mouse status is set, the PS/2 EFI driver 418 reads the data-out register 422 for mouse data. The PS/2 EFI driver 418 then dispatches the data read from the data-out register 422 to the mouse data memory destination 419 via the data distributor 417. Next, the PS/2

EFI driver 418 determines whether the EFI mouse driver 407 is available to receive data. When the EFI mouse driver 407 is available, the PS/2 EFI driver 418 calls the EFI mouse driver 407 to deliver the data to the EFI mouse driver 407. When data is not available to be read, the routine 500 continues from operation 510 to operation 517 where the EFI mouse driver returns a status indicating that the data is not ready to the application 402 and passes control to other routines.

When data is available to be read, the routine 500 continues from operation 510 to operation 512 where the EFI mouse driver reads the data from the mouse data buffer 419. The routine 500 then continues to operation 514 where a determination is made as to whether the data read completes a sequence. A sequence is complete when all of the bytes necessary for interpretation are present. For example, a mouse movement or a mouse button push may require a two-byte sequence, whereas a mouse initialization may require a four-byte sequence. Normally, the application 402 or the EFI mouse driver 407 will come to an entry point of the state machine table 450 as many times as the number of bytes are expected in a packet or sequence. If a sequence is not complete, the routine 500 continues to operation 517 described above.

When the data does complete a sequence, the routine 500 continues from operation 514 to operation 520. At operation 520, the EFI mouse driver 407 processes the data by forwarding the data packet as a complete sequence to the application 402. The EFI mouse driver 407 also stores the current state in the state machine table 450 as the state indicating that data has been processed. The routine 500 then continues to operation 524 where the EFI mouse driver 407 returns a status indicating that the data request has been successfully fulfilled and passes control to the application 402.

When control is again passed from the application 402 to the EFI mouse driver 407, the routine 500 continues at operation 502 again where the EFI mouse driver 407 determines a current state of communication. When the current state is a state indicating that a command is still in progress, the routine 500 continues from operation 502 to operation 507 described above.

When the current state is a state indicating new data is ready, the routine 500 continues from operation 502 to operation 522 where the EFI mouse driver processes the ready data by forwarding the data to the application 402. Next, at operation 523, the EFI mouse driver 407 stores the current state as a state indicating that data has been processed. The routine 500 then continues to operation 524 described above. When a data ready state is determined, it should be appreciated that the PS/2 EFI driver 418 processes mouse data in response to an EFI keyboard driver request, if mouse data is available at this time. Thus, mouse data may appear in the mouse data buffer 419 without the EFI mouse driver 407 requesting it. Similarly, in response to an EFI mouse driver request, keyboard data is processed by the PS/2 EFI driver 418 when keyboard data is available during such request. This doubles the responsiveness of the PS/2 EFI driver 418.

Figure 6:
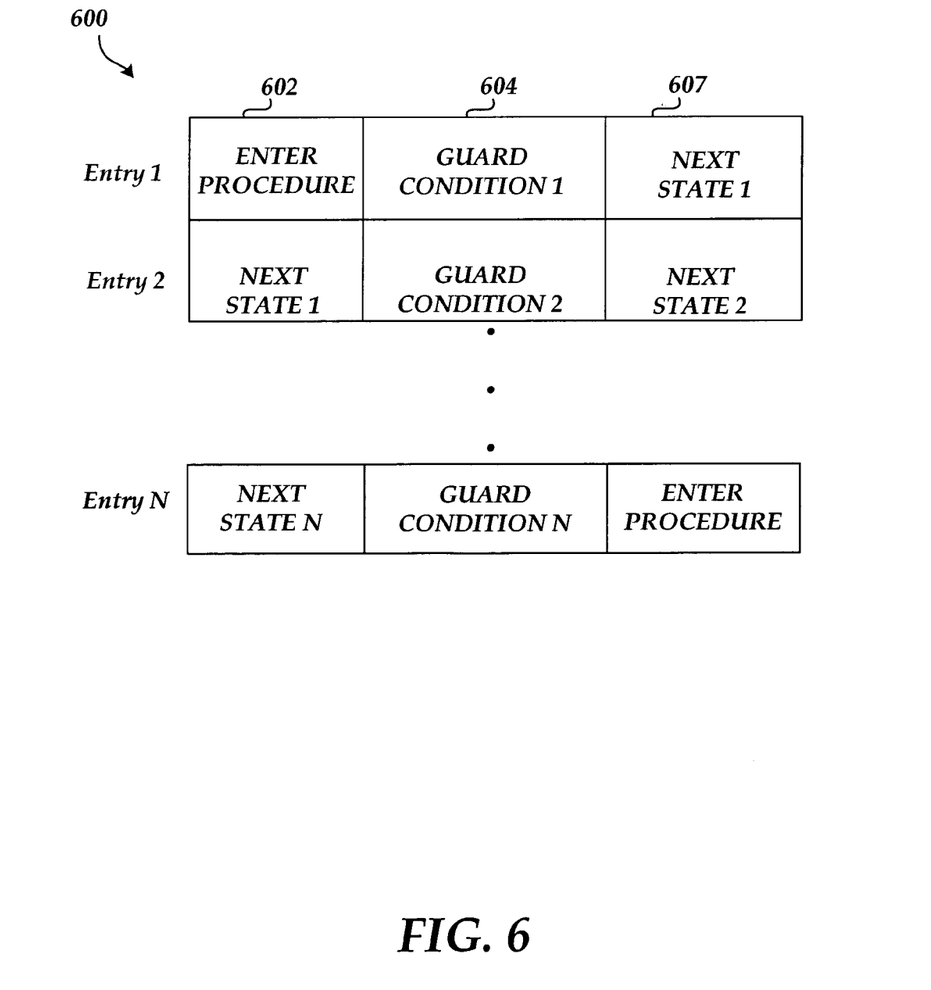
FIG. 6 is a diagram of a state machine table that illustrates various conditions associated with changing to a next state utilized in tracking a state of communication associated with a PS/2 device according to an embodiment of the invention.

FIG. 6 is a diagram of a state machine table 600 that illustrates various conditions associated with changing to a next state utilized in tracking a state of communication associated with a PS/2 device according to an illustrative embodiment of the invention. It should be appreciated that with respect to the application 402, the application layer 403 is only aware of when the mouse is moved or a mouse button is clicked. Other mouse communication occurs within the computing system. For instance, when the mouse 434 is connected to the mouse port 423, the mouse 434 needs to be initialized. Initialization is where traffic of the commands from the EFI mouse driver 407 and responses from the mouse 434 will be beyond what the application layer 403 sees. When the application is accessing the data during initialization the scenario becomes more complex. During initialization, the mouse 434 will respond with the name of the mouse, with geometry, with other data that is not just the data of the position of the mouse, so that adds to the complexity that the state machine 450 must handle.

The state machine table 600 includes three parts for every entry, entry 1 through entry N, where N is the number of entries. The three parts include an enter procedure part 602 that executes when a state is entered, a guard condition part 604 identifying conditions that must be met in the current state before a change to a next state, and a next state part 607 identifying the next state expected when the condition is met. Specifically, the guard condition 604 is a logic function that yields a result that acknowledges whether the condition is true or false. False means that the EFI mouse driver 407 cannot leave the current state and true means the EFI driver can change to the next state identified in the next state part 607.

Figure 7:
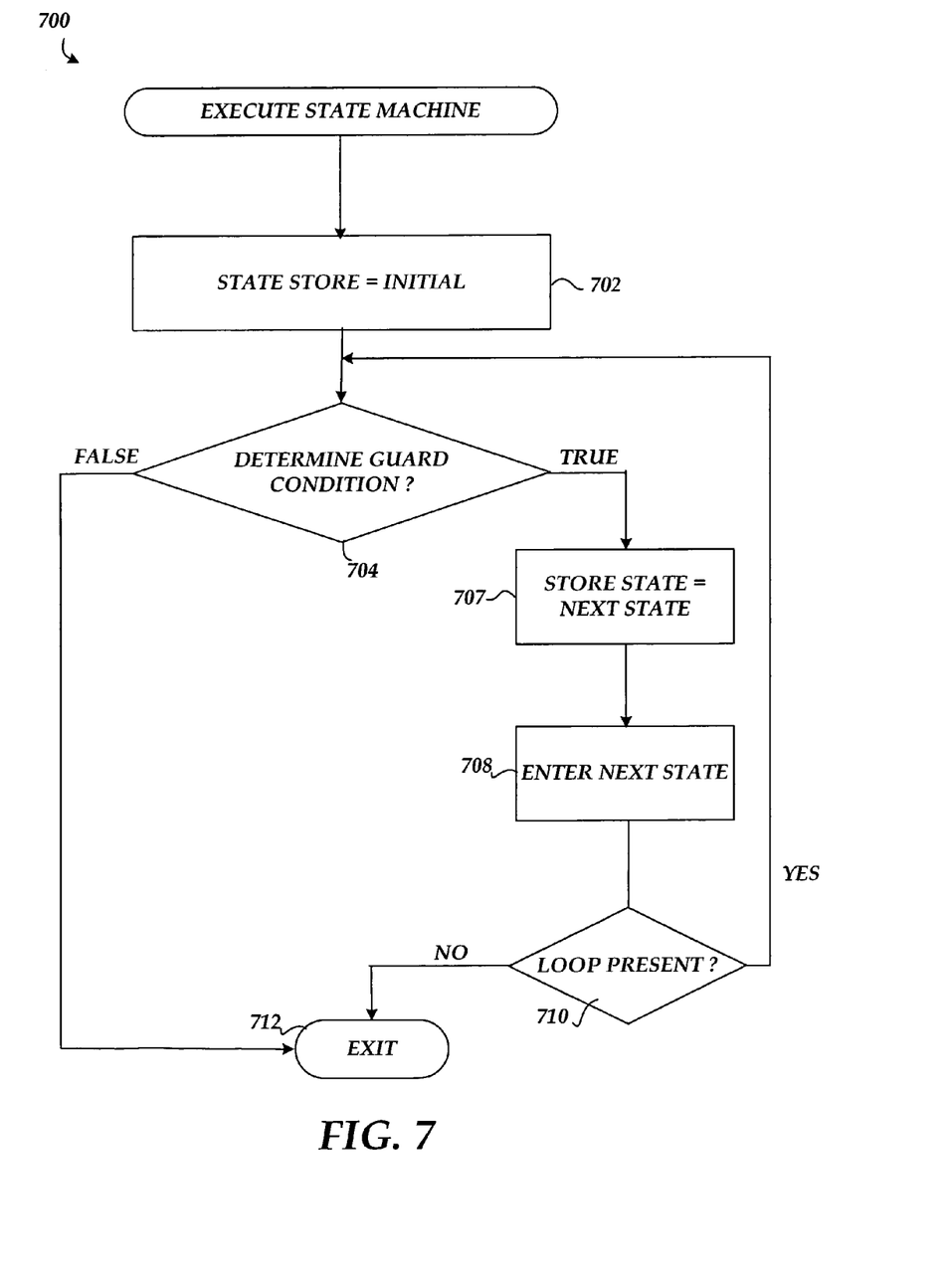
FIG. 7 is a flow diagram illustrating operations performed in executing a state machine according to an embodiment of the invention.

FIG. 7 is a flow diagram illustrating operations performed in executing a state machine according to an illustrative embodiment of the invention. Referring now to FIGS. 6 and 7 a routine 700 begins at operation 702 where the EFI mouse driver 407 initializes the state machine 450, this may be accomplished by storing an initial state as the current state, for example storing the state indicating that data has been processed. From operation 702, the routine 700 continues to operation 704.

At operation 704, the EFI mouse driver determines whether a guard condition associated with the current state is true or false. For example, the actual state machine table 600 may contain an address to code associated with the current state that determines whether the EFI mouse driver 407 will stay in the current state or change to the next state identified. The guard code checks certain conditions to determine whether the conditions are true or false. Thus, in order to check the guard, the EFI mouse driver 407 calls code at the identified address and the code returns either a true or false after verifying the condition. When the condition is false, the routine 700 continues to operation 712, where the EFI mouse driver 407 exits the state machine table 600.

When the condition is true, the routine 700 continues to operation 707 from operation 704. At operation 707, the EFI mouse driver 407 stores the next state as the current state. It should be appreciated that the next state could be a procedure or it could be just a number, an integer that is an offset on the state machine table 600 from a current state. The next state could also be an index in the table 600 or a procedure that will determine an index in the table 600. A procedure may be utilized because at some point there could be a force from state so that the EFI mouse driver 407 can go from the table 600 to another table. Next, at operation 708, the EFI mouse driver 407 enters the next state. This is accomplished when the EFI mouse driver 407 executes an enter procedure to enter the next state. The next state provides a new state. Thus, the enter procedure is code specific to the state. Thus, it is possible to go from state to state depending on the conditions of the data arriving at the EFI mouse driver 407.

Next at operation 710, the EFI mouse driver detects whether an optional loop is present. If the loop is present, the routine 700 returns to operation 704 described above. When the loop is not present, the routine 700 continues from operation 710 to operation 712 described above.

Figure 8:
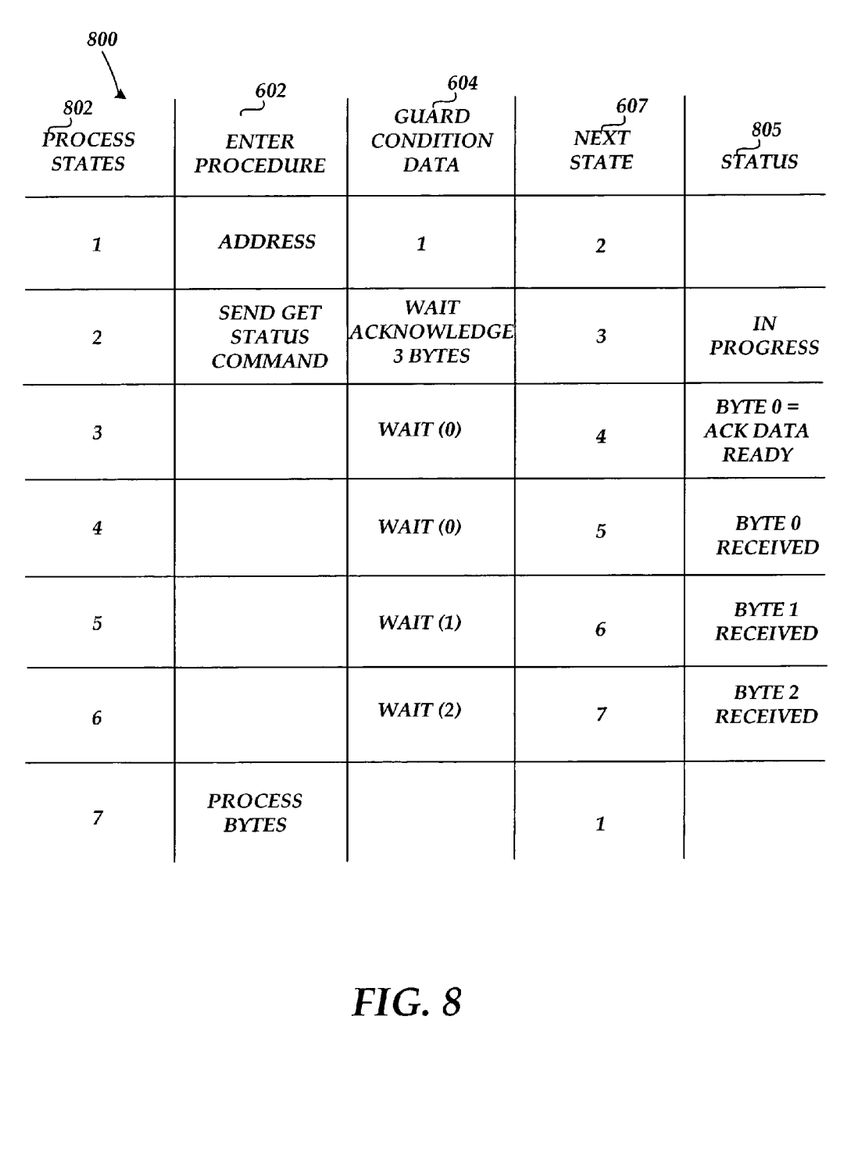
FIG. 8 is a state machine table diagram that illustrates various states utilized in tracking a state of communication associated with a PS/2 device according to an embodiment of the invention.

FIG. 8 is a state machine table diagram that illustrates various states utilized in tracking a state of communication associated with a PS/2 device according to an embodiment of the invention. Referring to FIGS. 5 and 8, the table 800 includes the three parts described with respect to FIG. 6. Additionally, process states are listed in column 802 and a status associated with an entry is listed in column 804. For example, process state 2 is entered upon the satisfaction of guard condition 1 associated with process state 1, the initial state. Process state 2, includes an enter procedure that includes a get status command sent from the EFI mouse driver 407. The guard condition for process state 2, a processed state, identifies that the EFI mouse driver 407 must wait on 3 bytes to complete a sequence of data. When the guard condition returns true, the EFI mouse driver 407 may continue to the next state 3 when control is returned to the EFI mouse driver by the application and the status is "command in progress".

The process state 2 entry is a state where a command is sent and the device status is checked. If there is no data out, data "not ready" is returned. In the wait, the EFI mouse driver 407 looks for the status in the PS/2 controller 14. If the status is not there, then wait is false and the EFI mouse driver has to stay in the process state 2 when control is returned. When wait returns true, process state 3 may be entered.

Next, at process state 3, the EFI mouse driver waits for an acknowledgement (ACK) of byte (0) and thus, no commands are sent. When byte (0) equals ACK, the guard condition for process state 3 returns true and the EFI mouse driver 407 may continue to the next state 4. So with respect to a data-ready state, the next state is a function that says if acknowledged then the status is data ready.

At process state 4, the guard condition waits for the first byte, byte (0) of a complete three-byte sequence. Until the byte arrives, the guard remains until control is returned and the byte is stored in a buffer. When the byte (0) is accounted for, the EFI mouse driver 407 may advance to process state 5.

Similarly, at process states 5 and 6, the guard condition waits for the second and third bytes of the complete sequence. Thus, each line or entry in the table represents one byte of data. Upon arrival of the third byte, process state 7 is entered where the sequence is processed in other words forwarded to the application 402. At this point, the EFI mouse driver may return to an initial state, process state 1. With the use of a table, an explicit protocol for any type of communication with the mouse 434, or other slow PS/2 devices, can be coded for the communication expected to take place. And because control is returned to the application immediately after finding that a certain piece of data is not ready yet, a minimal amount of time is spent in the driver capturing all the data.

It should be appreciated that embodiments of the present invention provide methods, systems, apparatuses, and computer-readable media for tracking a state of communication between a PS/2 device and a PS/2 device driver within an EFI environment. Although the invention has been described in language specific to computer structural features, methodological acts and by computer readable media, it is to be understood that the invention defined in the appended claims is not necessarily limited to the specific structures, acts or media described. Therefore, the specific structural features, acts and mediums are disclosed as exemplary embodiments implementing the claimed invention.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

We claim:

1. A method for tracking a state of communication between a PS/2 device and a PS/2 device driver within an extensible firmware interface (EFI) environment, the method comprising:

receiving from an application associated with the EFI environment a request for data;

in response to receiving the request, reading a state machine table within the PS/2 device driver to determine a current state in processing a data sequence being sent from the PS/2 device, wherein the current state is stored within the state machine table and comprises one of a state indicating that data has been processed, a state indicating that a command is in progress, and a state indicating that data is ready;

in response to determining that the current state is the state indicating that data has been processed, utilizing the state machine table to select and execute a routine to send a command to determine a status of the PS/2 device and store the current state as the state indicating that a command is in progress;

in response to determining that the current state is the state indicating that a command is in progress, utilizing the state machine table to select and execute a routine to determine whether the PS/2 device has data available for delivery to the PS/2 device driver; and in response to determining that no data is available for delivery to the PS/2 device driver, returning a status indicating that data is not ready, store the current state as the state indicating that a command is in progress, and pass control back to the application.

2. The method of claim 1, further comprising:

in response to determining that data is available for delivery to the PS/2 driver, reading the data available for delivery and determining whether the data sequence is complete; and in response to determining that the data sequence is not complete, returning the status indicating that data is not ready, storing the current state as the state indicating that a command is in progress, and passing control back to the application.

3. The method of claim 2, further comprising:

in response to determining that the data sequence is complete, forwarding the data sequence to the application, storing the current state as the state indicating that data has been processed, and returning a status indicating that the request for data is fulfilled.

4. The method of claim 1, further comprising:

in response to determining that the current state is the state indicating that data is ready, utilizing the state machine table to select and execute a routine to receive the data, store the current state as the state indicating that data has been processed, and return a status indicating that the request for data is fulfilled.

5. The method of claim 1, wherein an initial state of the current state comprises the state indicating that data has been processed.

6. The method of claim 1, wherein utilizing the state machine table comprises further comprises:

a) storing an initial state of the state machine as a current state of communication;

b) determining whether a condition for advancing to a next state has been fulfilled wherein the condition is associated with the current state;

c) in response to determining that the condition for advancing to the next state has been fulfilled, storing the next state of communication as the current state and entering the next state of communication; and d) in response to determining the condition for advancing to the next state has not been fulfilled, remaining at the current state.

7. The method of claim 6, wherein utilizing the state machine table further comprises repeating b)-d).

8. The method of claim 1, wherein the PS/2 device provides data via a common input device controller and wherein determining whether the PS/2 device has data available for delivery to the PS/2 device driver comprises determining whether data is present in a data out register of the common input device controller.

9. The method of claim 4, wherein the PS/2 device provides data via a common input device controller and wherein receiving the data comprises receiving the data from a PS/2 EFI driver storing the data in response to a request from another PS/2 device driver.

10. The method of claim 1, wherein the PS/2 device driver comprises an EFI mouse driver and wherein the PS/2 device comprises a mouse.

11. A computer storage medium having control logic stored therein for causing a computer to implement a state machine within a PS/2 device driver to track states of communication to and from a PS/2 device within an extensible firmware interface (EFI) environment, the control logic comprising computer-readable program code for causing the computer to:

receive from an application associated with the EFI environment a request for data;

in response to receiving the request, read a state machine table within the PS/2 device driver to determine a current state in processing a data sequence being sent from the PS/2 device, wherein the current state is stored within the state machine table and comprises one of a state indicating that data has been processed, a state indicating that a command is in progress, and a state indicating that data is ready;

in response to determining that the current state is the state indicating that data has been processed, utilize the state machine table to select and execute a routine to send a command to determine a status of the PS/2 device and store the current state as the state indicating that a command is in progress;

in response to determining that the current state is the state indicating that a command is in progress, utilize the state machine table to select and execute a routine to determine whether the PS/2 device has data available for delivery to the PS/2 device driver; and in response to determining that no data is available for delivery to the PS/2 device driver, return a status indicating that data is not ready, store the current state as the state indicating that a command is in progress, and pass control back to the application.

12. The computer storage medium of claim 11, further comprising computer-readable program code for causing the computer to:

in response to determining that data is available for delivery to the PS/2 driver, read the data available for delivery and determine whether the data sequence is complete;

in response to determining that the data sequence is not complete, return the status indicating that data is not ready, store the current state as the state indicating that a command is in progress, and pass control back to the application; and in response to determining that the data sequence is complete, forward the data sequence to the application, store the current state as the state indicating that data has been processed, and return a status indicating that the request for data is fulfilled.

13. The computer storage medium of claim 11, further comprises further comprising computer-readable program code for causing the computer to:

in response to determining that the current state is the state indicating that data is ready, utilize the state machine table to select and execute a routine to receive the data, store the current state as the state indicating that data has been processed; and return a status indicating that the request for data is fulfilled.

14. A method for tracking states of communication to and from a PS/2 device within an extensible firmware interface (EFI) environment, the method comprising:

determining a current state in processing a data sequence being sent from the PS/2 device wherein the current state comprises one of the following:
a state indicating that data has been processed,
a state indicating that a command is in progress, and
a state indicating that data is ready;

in response to determining that the current state is the state indicating that data has been processed, sending a command to determine a status of the PS/2 device and storing the current state as the state indicating that a command is in progress;

in response to the current state being the state indicating that a command is in progress, determining whether the PS/2 device has data available for delivery to a PS/2 device driver; and in response to determining that no data is available for delivery, returning a status indicating that data is not ready, storing the current state as the state indicating that a command is in progress, and passing control to an application.

15. The method of claim 14, further comprising:

in response to determining that data is available for delivery to the PS/2 driver, reading the data available for delivery and determining whether the data sequence is complete;

in response to determining that the data sequence is not complete, returning the status indicating that data is not ready, storing the current state as the state indicating that a command is in progress, and passing control back to the application; and in response to determining that the data sequence is complete, forwarding the data sequence to the application, storing the current state as the state indicating that data has been processed, and returning a status indicating that the request for data is fulfilled.

16. The method of claim 15, further comprising in response to determining that the current state is the state indicating that data is ready:

receiving the data;
storing the current state as the state indicating that data has been processed; and
returning a status indicating that the request for data is fulfilled.

* * * * *

UNITED STATES PATENT AND TRADEMARK OFFICE
CERTIFICATE OF CORRECTION

| | |
|---|---|
| PATENT NO. | : 7,415,547 B1 |
| APPLICATION NO. | : 11/118257 |
| DATED | : August 19, 2008 |
| INVENTOR(S) | : Andriy Naborskyy and Oleg Ilyasov |

Page 1 of 1

It is certified that error appears in the above-identified patent and that said Letters Patent is hereby corrected as shown below:

Beginning in Column 14, line 59, and ending with Column 14, line 60 should read:

6.  The method of claim 1, wherein utilizing the state machine table comprises ~~further comprises~~:

Beginning in Column 16, line 9, and ending with Column 16, line 11 should read:

13.  The computer storage medium of claim 11, ~~further comprises~~ further comprising computer-readable program code for causing the computer to:

Signed and Sealed this

Thirtieth Day of December, 2008

JON W. DUDAS
*Director of the United States Patent and Trademark Office*